May 26, 1970     H. E. STOBER     3,513,917
HYDRAULICALLY OPERATED YARD AND GARDEN IMPLEMENT
Filed April 13, 1967     4 Sheets-Sheet 4
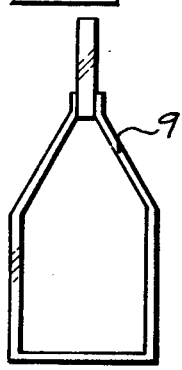
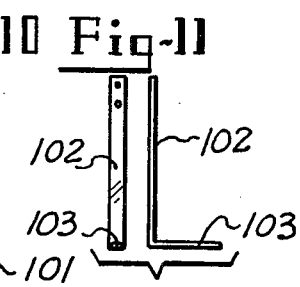
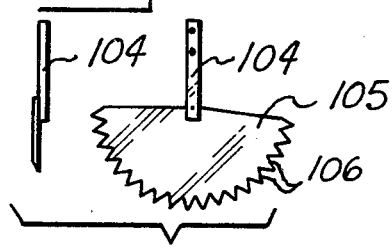
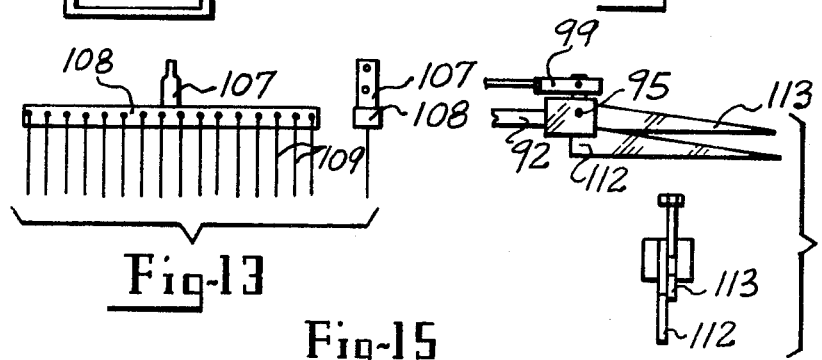
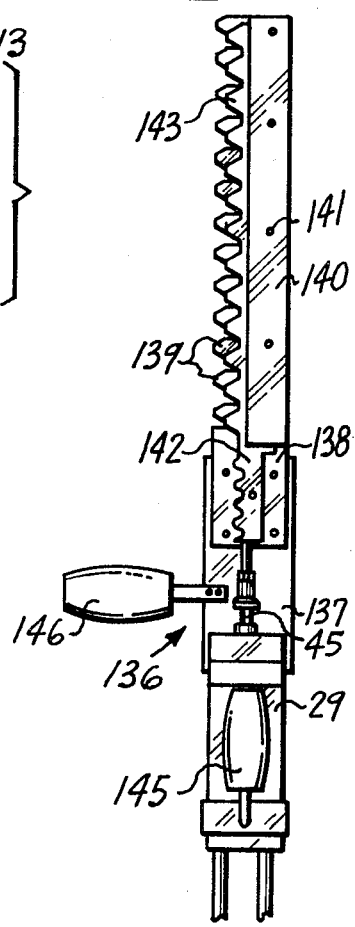
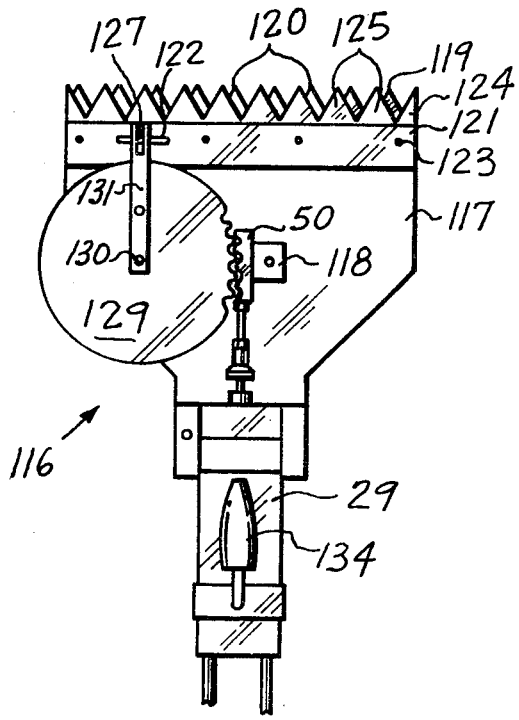
INVENTOR.
HARLEY E. STOBER
BY
ATTYS.

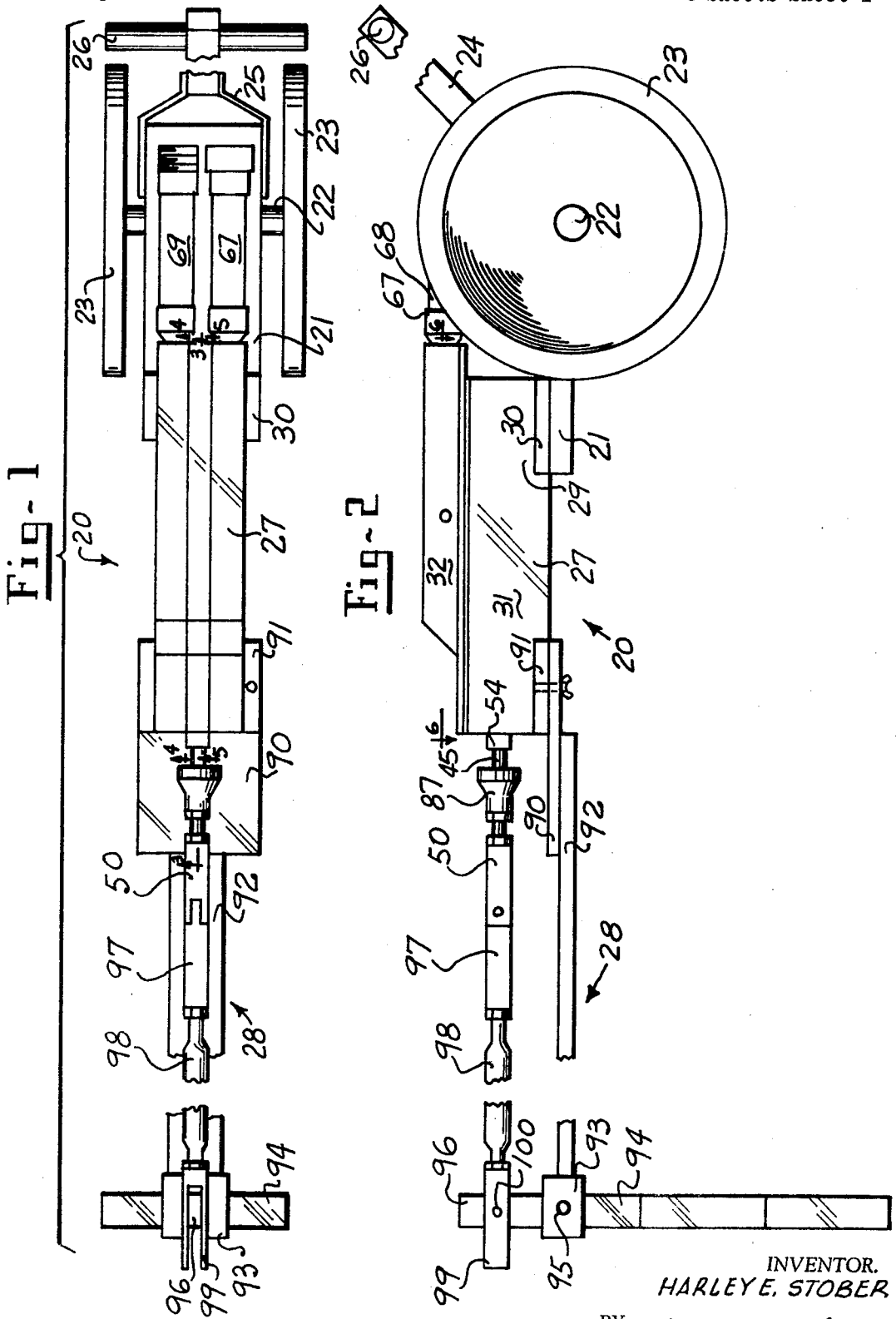

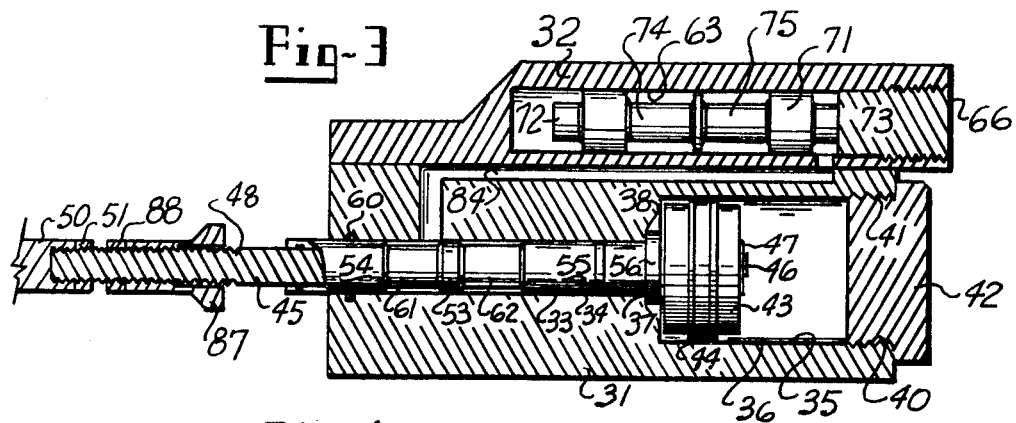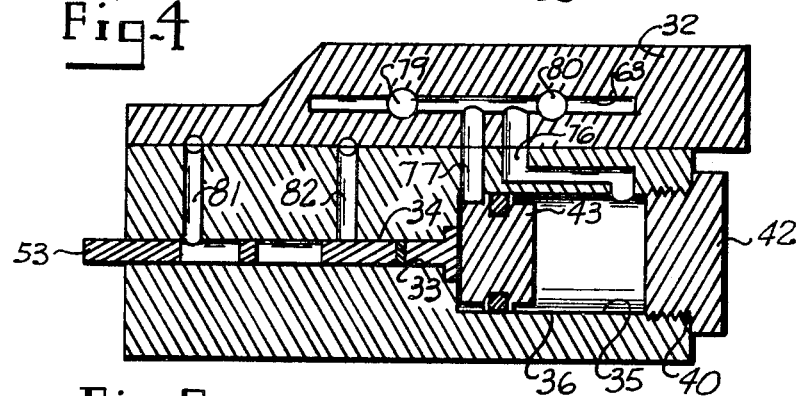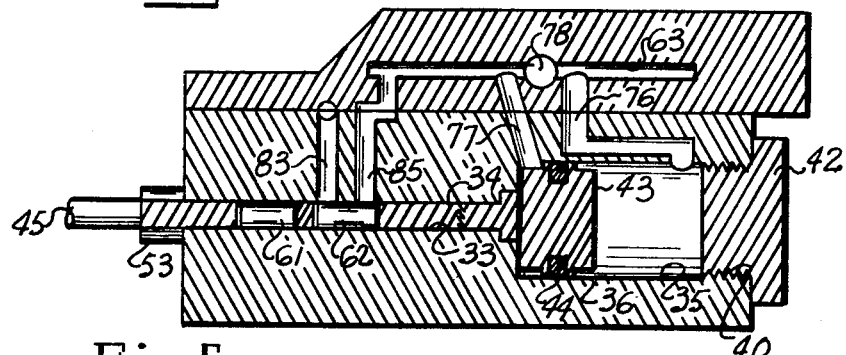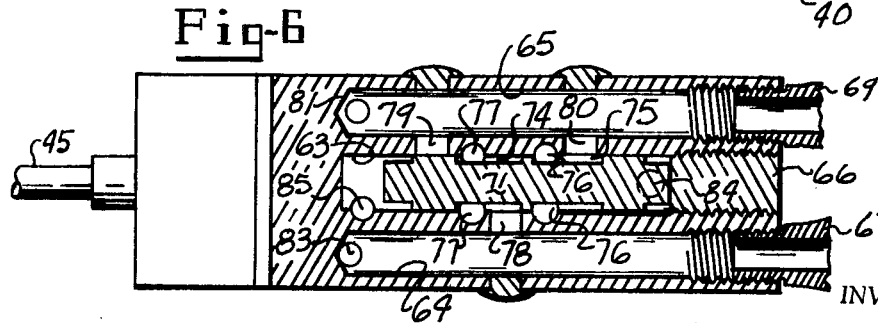

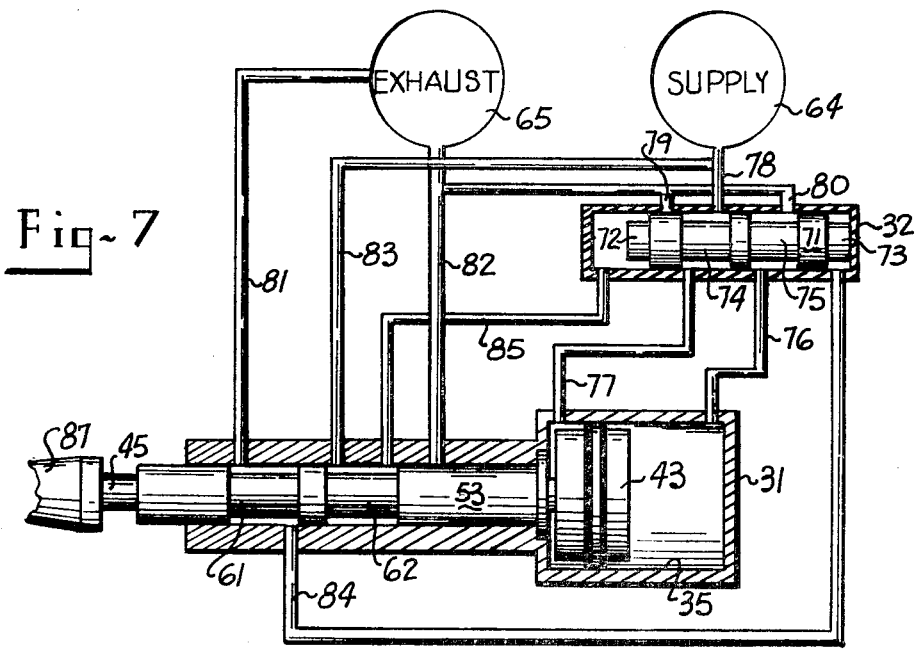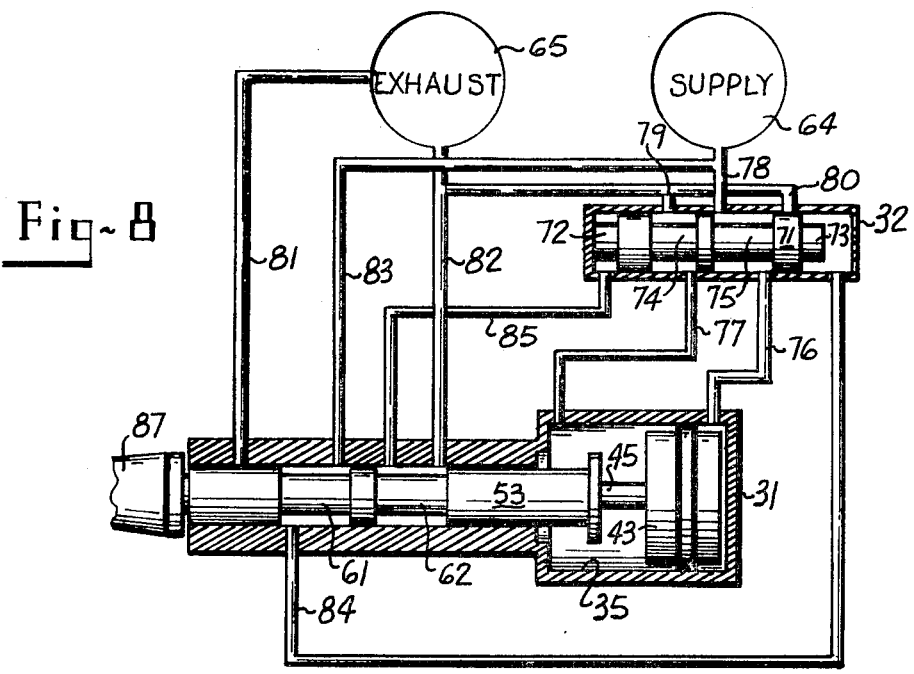

_United States Patent Office_

3,513,917
Patented May 26, 1970

3,513,917
HYDRAULICALLY OPERATED YARD AND GARDEN IMPLEMENT
Harley E. Stober, 5011 N. Greenwood,
Spokane, Wash. 99208
Filed Apr. 13, 1967, Ser. No. 630,691
Int. Cl. A01b 33/04, 39/10
U.S. Cl. 172—101                          4 Claims

ABSTRACT OF THE DISCLOSURE

The disclosure describes a hydraulically operated yard and garden implement that has a platform 21 mounted on a shaft that is supported by wheels 23. A handle 24 extends upward from the platform. A hydraulic reciprocating motor 27 is mounted on the platform with a piston rod 45 extending forward therefrom. A tool attachment 28 is mounted to the forward part of the motor housing 29. The tool attachment 28 has an extension arm 92 for pivotally supporting a tool such as a cultivator tool 94 on the end thereof. A connecting rod 98 interconnects the piston rod 45 with the tool 94 to transmit the movement thereto.

OBJECTS AND SUMMARY OF THE INVENTION

My invention relates to yard and garden implements and more particularly to yard and garden implements that are hydraulically operated.

One of the principal objects of my invention is to provide a versatile hydraulically operated yard and garden implement that is capable of utilizing the utility water supply as a source of power.

An additional object of my invention is to provide a versatile yard and garden implement that is efficient in operation, simple in construction and economical to manufacture.

A further object of my invention is to provide a novel hydraulic motor for driving a yard and garden implement.

An additional object of my invention is to provide a hydraulic motor that has a stroke mechanism that may be readily adjusted to vary the stroke of the motor from the outside of the hydraulic motor.

A still further object of my invention is to provide a valving mechanism with unconnected parts for controlling the application of the hydraulic pressure in the hydraulic motor.

With these and other objects in mind, my invention concerns a hydraulically operated yard and garden implement that utilizes the utility water supply as a source of power. The implement has a platform mounted on wheels with a handle projecting upwardly from the platform. A hydraulic motor is mounted to the platform with a piston rod extending from the motor. A tool attachment is mounted to the motor. The tool attachment has a stationary frame secured to the motor and a tool movably mounted to the frame for working the soil of the yard or garden. The tool attachment also includes an interconnecting mechanism for connecting the piston rod and the tool for transmitting the reciprocating motion to the tool. More particularly, the hydraulic motor comprises a housing having a piston and a piston rod slidably mounted therein for reciprocating movement. A hollow first valve spool is slidably mounted on the piston rod for hydraulically operating a second spool that is slidably mounted in the housing. The second spool is responsive to the positioning of the first spool for alternating the hydraulic pressure from one end of the piston to the other to reciprocate the piston. An adjustable stroke collar is mounted on the piston rod to engage and move the first spool during the return stroke of the piston rod.

BRIEF DESCRIPTION OF THE DRAWINGS

A preferred embodiment of my invention illustrated in the accompanying drawings, in which:

FIG. 1 is a plan view of the hydraulically operated yard and garden implement incorporating the principal features of my invention including a tool attachment;

FIG. 2 is a side elevational view of the implement;

FIG. 3 is a fragmentary cross sectional view taken on line 3—3 in FIG. 1 showing several of the principal features of a hydraulic motor for driving the tool attachment;

FIG. 4 is a fragmentary cross sectional view taken on line 4—4 in FIG. 1;

FIG. 5 is a fragmentary cross sectional view taken on line 5—5 in FIG. 1;

FIG. 6 is a cross sectional view taken on line 6—6 in FIG. 2;

FIG. 7 is a line schematic of the hydraulic motor showing the piston rod in an extended position;

FIG. 8 is a line schematic of the hydraulic motor showing the piston rod in the retracted position;

FIG. 9 is a front view of a cultivating tool;

FIG. 10 is a front and side view of a rooter tool;

FIG. 11 is a front and side view of a weeder tool;

FIG. 12 is a front and side view of an edger tool;

FIG. 13 is a front and side view of a raking tool;

FIG. 14 is a front and side view of a trimmer tool;

FIG. 15 is a plan view of a mower attachment; and

FIG. 16 is a plan view of a hedge clipper attachment.

DESCRIPTION OF THE PREFERRED EMBODIMENT

Referring now in detail to the drawings, FIG. 1 shows a yard and garden implement generally designated by the arrow 20 that is useful in performing work in the yard or garden. The implement 20 utilizes the utility water supply as a source of power. The implement 20 comprises a platform 21 that is affixed to a shaft 22. Wheels 23 are mounted on the ends of the shaft 22 to support the shaft and platform. A handle 24 is mounted to the platform 21 by handle brackets 25. The handle 24 extends upward and rearward from a platform 21. A handlebar 26 is transversely attached to the upper end of the handle 24 to enable the operator to conveniently grip and push the implement.

A hydraulic motor 27 is mounted to the platform 21 for operating a tool attachment.

The motor 27 has a housing 29 that is mounted in a V-way 30 of the platform 21. The housing 29 has a piston section 31 that is aligned with the axis of the motor and a control section 32 that is parallel to but offset from the longitudinal axis of the motor.

The piston section 31 (FIGS. 3–5) has a bore 33 formed therethrough having a cylindrical wall 34. A piston cavity or counterbore 35 is formed in one end of the bore 33 having a cylindrical piston wall 36. A stepped groove 37 is cut in the wall 34 between the bore 33 and the counterbore 35 to form a shoulder 38. A counter-counterbore 40 is formed in the end of the counterbore 35 having a threaded wall 41 for receiving a threaded end cap 42 to enclose one end of the piston cavity formed by the bore 34, counterbore 35 and counter-counterbore 40.

A piston 43 is slidably mounted within the counterbore 35. The piston has a circumferential seal 44 on the periphery for preventing fluid from moving past the piston. A piston rod 45 has a threaded end 46 that is secured to the piston 43 by an end nut 47. The other end 48 of the piston rod 45 extends through the bore 33 and is threaded for receiving a gear rack block 50 thereon. The block 50 is secured to the piston rod end 48 by a lock nut 51.

A hollow valve spool 53 is slidably mounted in the bore 33 and on the piston rod 45. The spool 53 is of such a length that when the piston rod is extended one end 54 of the spool 53 extends from the housing 29 and when the piston rod is retracted the other end 55 extends into the counterbore 35 (FIGS. 7 and 8). An angular abutment ring 56 is formed on the end 55 for engaging the shoulder 38 to restrict the longitudinal movement of the spool 53. A seal 60 is mounted in the wall 34 for sealing engagement with the spool 53.

The spool 53 has two wide axially spaced circumferential grooves 61 and 62 formed in the periphery thereof.

The control section 32 of the housing 29 has a central bore 63 formed therein. The control section 32 has two outer bores 64 and 65 (FIG. 6) that are parallel to the central bore 63 and radially spaced therefrom. The outer bore 64 serves as an inlet port and the outer bore 65 serves as an exhaust port. A threaded plug 66 is mounted in the threaded end of the central bore 63 to enclose the central bore. A supply fitting 67 is mounted in the inlet port 64 for attaching to a supply hose. An exhaust fitting 69 is mounted in the exhaust port 65 for connection with an exhaust hose.

A valve spool 71 (FIG. 3) is slidably mounted in the central bore 63 for reciprocal movement. The spool 71 has radially reduced ends 72 and 73. The spool 71 has two wide axially spaced circumferential grooves 74 and 75 that are formed in the periphery thereof.

The housing 29 has an aperture 76 (FIGS. 4–8) formed therein extending between the bore 63 and one end of the piston cavity 35. An aperture 77 is formed in the housing 29 extending between the bore 63 and the other end of the cavity 35. A supply inlet 78 (FIGS. 6, 7 and 8) is formed in the control section 32 extending between the inlet port 64 and the central bore 63. Exhaust outlets 79 and 80 are formed in the control section 32 extending between the central bore 63 and the exhaust port 65 axially spaced from the inlet 78. An exhaust passageway 81 (FIG. 4) extends from the bore 33 to the exhaust port 65. An exhaust passageway 82 extends from the exhaust port 65 to the bore 33 axially spaced from the exhaust passageway 81. A supply passageway 83 (FIG. 6) is formed in the housing 29 and extends from the inlet port 64 to the bore 33 intermediate the exhaust passageways 81 and 82. A first control passageway 84 (FIG. 3) is formed in the housing 29 and extends from one end of the central bore 63 adjacent the end 73 of the spool 71 to the bore 33 intermediate the exhaust passageway 81 and the supply passageway 83. A second control passageway 85 (FIG. 5) is formed in the housing 29 and extends from the other end of the central bore 63 adjacent the end 72 to the bore 33 intermediate the exhaust passageway 82 and the supply passageway 83.

A stroke collar 87 is mounted on the piston rod 45 longitudinally spaced from the spool 53. A lock nut 88 secures the stroke collar to the piston rod 45. The stroke collar 87 may be longitudinally moved along the piston rod 45 to vary the stroke of the piston rod 45 by loosening the lock nut 88 and turning the collar on the piston rod. When the piston rod 45 moves in its returned stroke, the collar 87 engages and moves the spool 53.

In operation of the hydraulic motor 27, hydraulic fluid is applied alternatively to the ends of the piston 43 to reciprocate the piston rod 45 as illustrated in FIGS. 7 and 8. For purposes of illustration it will be assumed that piston rod is in the extended position with the groove 61 of the spool 53 aligned with the control passageway 84 and the exhaust passageway 81 to permit communication therebetween. Circumferential groove 62 is aligned with the control passageway 85 and the supply passageway 83 to permit communication therebetween. The fluid entering the port 64 is communicated through the supply passageway 83 and the control passageway 85 to the central bore 63 adjacent the spool end 72 to move the spool in the central bore 63 to the right so that the groove 74 is aligned with the aperture 77 and the supply inlet 78 to permit communication therebetween to supply fluid to the left end of the cavity 35. Groove 75 is aligned with the aperture 76 and the exhaust outlet 80, to exhaust fluid from the right end of the cavity 35 to move the piston and piston rod to the retracted position. As the piston moves to the right the stroke collar engages and moves the spool 53 from the extended position to the retracted position thereby moving the circumferential grooves 61 and 62 so that groove 61 is registered with the control passageway 84 and the supply passageway 83 to supply fluid to the control passageway 84. The groove 62 is moved into alignment with the exhaust passageway 82 and the control passageway 85 to exhaust the control passage 85 to move the spool 71 to the left. As the spool 71 moves to the left, the circumferential groove 74 moves into registration with the aperture 77 and the exhaust outlet 79 to exhaust the fluid pressure from the left side of the piston 43. The groove 75 is in registration with the aperture 76 and the supply inlet 78 so that the fluid is supplied to the right side of the piston 43 to permit the piston rod 45 to move to the extended position. As the piston 43 and the piston rod 45 move to the left to the extended position, the piston 43 engages and moves the spool 53 to the left or the extended position to start the cycle over again.

It should be noted that the stroke collar 87 may be axially adjusted on the piston rod 45 so that the distance between the collar 87 and the spool 53 may be varied to vary the stroke of the piston 43.

The hydraulic motor 27 produces a reciprocating motion that is utilized in moving the tools that are mounted on the tool attachment 28. The implement 20 is so designed that several types of tool attachments may be connected to the implement to perform various types of work tasks. Each of the tool attachments has a stationary frame affixed to the motor housing 27 and a movable tool that is driven by the motor 27. The attachment 28 also includes an interconnecting mechanism that connects the movable tool and the piston rod 45 to transfer the reciprocating motion to the tool.

FIGS. 1 and 2 specifically show a cultivating attachment. The cultivating attachment has a plate 90 secured to the motor 29. The plate 90 is secured to the motor housing 29 by a clamp 91. An extension bar 92 extends from the plate 90. A pivot yolk 93 is mounted on the end of the extension bar 92 for receiving a cultivating tool 94 that is mounted on a shaft 95 that is supported on the pivot yolk 93. One end 96 of the cultivating tool extends upwardly from the shaft 95. An end block 97 is attached to the gear rack block 50. A connecting rod 98 is attached to the block 97 and extends forward parallel with the extension bar 92. A yolk block 99 is mounted on the end of the connecting rod 98 and is secured to the upper end 96 by pin 100. As the piston rod 45 reciprocates, the connecting rod 98 pivots the cultivating tool 94 about the shaft 95 to move the lower end of the cultivating tool 94 back and forth to cultivate the soil.

FIG. 9 shows a front view of the cultivating tool 94.

FIG. 10 shows a rooter tool 101 that may be pivotally mounted on the shaft 95. As the rooter tool 101 is pivoted about the shaft 95, it performs a digging operation to aerate the soil.

FIG. 11 illustrates a weeder tool 102 that has a horizontally extending blade 103. The weeder tool may be pivotally mounted on the shaft 95. FIG. 12 illustrates an edger tool 104 that has a blade sector 105 with a plurality of teeth 106 formed along the periphery for performing the cutting action in the soil. The edger 104 may be pivotally mounted on the shaft 95.

FIG. 13 shows a raking tool 107 having a horizontal bar 108 with a plurality of resilient fingers 109 extending downwardly for raking the yard or the garden. The rake 107 may be pivotally mounted on the shaft 95.

FIG. 14 shows a trimmer tool having a stationary blade 112 secured to the extension bar 92. A movable blade 113 is pivotally mounted on the shaft 95. The upper portion of the movable blade 113 is connected to the yolk block 99. As the connecting rod 98 is reciprocated, the movable blade is pivoted around the shaft 95 to perform a shearing action with the blade 112. The trimmer is particularly effective in cutting grass along the edge of a sidewalk or walkway.

FIG. 15 illustrates a mower attachment 116 that has a base plate 117 secured to the motor housing 29. A guide block 118 is mounted on the base plate 117 for guiding the rack 50. The front edge 119 of the base plate 117 has a plurality of teeth formed therein. A transverse guide 121 is mounted to the base plate 117 forming a transverse slot therebetween. The transverse guide bracket 121 has an elongated aperture 122 formed therethrough. A plurality of pins 123 extend from the bracket 121 through the slot to the base plate 117. A cutting bar 124 is slidably mounted in the slot between the bracket 121 and the base plate 114. A plurality of cutting teeth 125 are formed in the cutting bar 124 for operating in cooperation with the teeth 120 to perform a shearing mower action. The cutting bar 124 has a plurality of elongated apertures 126 formed therein to receive the pins 123 for limiting the transverse reciprocating movement of the cutting bar 124. A drive pin 127 is attached to the cutting bar 124 and extends upwardly through the elongated aperture 122. A pinion 129 is rotatably mounted on a shaft 130 that extends upwardly from the base plate 117. The pinion 129 meshes with the rack 50 for oscillating about the shaft 130 as the rack 50 is reciprocated. An arm 131 is secured to the pinion 129 and radially extends therefrom toward the front edge 119 of the base plate 117. A slot 132 is formed in the end of the arm 131 for receiving the drive pin 127.

In operation as the rack 50 is reciprocated the pinion 129 oscillates to pivot the arm 131. The arm 131 moves against the drive pin 127 to reciprocate the cutting bar 127 in relation to the base plate 117.

The implement is so designed that the motor and the mower attachment 116 may be removed from the platform 21 and held by the operator in performing the mowing operation. To facilitate such use, a handle 134 is attached to the motor housing 129.

FIG. 16 illustrates a hedge clipper attachment 136 for contouring hedges. The hedge clipper attachment 136 has a base plate 137 that is secured to the housing 29. A stationary cutting bar 138 is mounted to the base plate 137 and extends forward therefrom. A plurality of teeth 139 are formed in the side edge of the cutting bar 138. A longitudinal guide bracket 140 is secured to the cutting bar 138 to form a longitudinal slot therebetween to receive a movable cutting bar 142. A plurality of pins 141 extend between stationary cutting bar 138 and bracket 140. The movable cutting bar 142 has a plurality of teeth formed therein for registration with the teeth 139 to perform the cutting action when the piston rod 45 is reciprocated. The cutting bar 142 has a plurality of elongated apertures 144 formed therethrough to receive the pins 141 and to limit the longitudinal reciprocating movement of the cutting bar 142.

It is often desirable to remove the hydraulic motor 27 and the hedge clipper attachment 136 from the platform 21 to clip a hedge. To facilitate such an operation, a handle 145 is secured to the housing 29 to be gripped by one hand of the operator. A second handle 146 is mounted to the base plate 137 to be gripped by the other hand of the operator.

It is understood that the above described embodiments are simply illustrative of the application of the principles of my invention. Numerous other arrangements may be readily devised by those skilled in the art which will embody the principles of my invention and fall within the sphere and the scope thereof.

What I claim as my invention is:

1. A hydraulic motor for a yard and garden apparatus comprising:
   (a) a motor housing having:
      (1) a first bore formed therein;
      (2) a counterbore formed in one end of the first bore; and
      (3) a second bore formed therein parallel to the first bore;
   (b) a hollow first valve spool slidably mounted in the first bore for movement between an extended position projecting from the housing and a retracted position projecting into the counterbore;
   (c) a piston slidably mounted in the counterbore for reciprocating movement to engage and move the first spool from the retracted position to the extended position;
   (d) a piston rod slidably mounted in the first valve spool with one end thereof affixed to the piston and the other end thereof projecting from the housing and the first spool;
   (e) a stroke collar mounted to the projecting end of the piston rod for engaging and moving the first spool from the extended position to the retracted position when the piston rod is moved in a return stroke; and
   (f) a second valve spool slidably mounted in the second bore, said second spool being responsive to the positioning of the first spool for alternating the hydraulic pressure to the ends of the counterbore to reciprocate the piston.

2. The motor as defined in claim 1 wherein the stroke collar may be moved longitudinally along the piston rod for varying the distance from the first spool to alter the stroke of the piston.

3. The motor as defined in claim 2 wherein the motor housing further includes:
   (a) a supply port;
   (b) an exhaust port;
   (c) a first exhaust passageway extending from the first bore to the exhaust port;
   (d) a second exhaust passageway extending from the exhaust port to the first bore axially spaced from the first exhaust passageway;
   (e) a third exhaust passageway extending from the exhaust port to the second bore;
   (f) a fourth exhaust passageway extending from the exhaust port to the second bore axially spaced from the third exhaust passageway;
   (g) a first supply passageway extending from the supply port to the first bore intermediate the first and second exhaust passageways;
   (h) a second supply passageway extending from the supply port to the second bore intermediate the third and fourth exhaust passageways;
   (i) a first aperture extending from the second bore to one end of the counterbore intermediate the third exhaust passageway and the second supply passageway;
   (j) a second aperture extending between the second and the other end of the counterbore intermediate the fourth exhaust passageway and the second supply passageway;
   (k) a first control passageway extending between one end of the second bore and the first bore intermediate the first exhaust passageway and the first supply passageway; and
   (l) a second control passageway extending between the other end of the second bore to the first bore intermediate the first supply passageway and the second exhaust passageway; and wherein the hollow spool has a pair of axially spaced circumferential grooves formed thereon so that when the first spool is in the extended position, one of the grooves interconnects the first exhaust passageway and the first control passageway, and the other groove interconnects the first supply passageway and the second control passageway and when the first spool is in the retracted position, the first groove interconnects the first control passageway and the first supply passageway and the second groove interconnects the second control passageway and the second exhaust passageway; and wherein the second spool has a pair of circumferential grooves formed therein that are axially spaced so that when the first spool is in the forward position, the first groove of the second spool interconnects the second supply passageway and the first aperture and the second groove of the second spool interconnects the fourth exhaust passageway and the second aperture and when the second spool is in the rear position, the first groove of the second spool interconnects the third exhaust passageway and the first aperture and the second groove of the second spool interconnects the second supply passageway and the second aperture.

4. A hydraulically operated yard and garden apparatus comprising:
  (a) an axle;
  (b) wheels mounted on the ends of the axle;
  (c) a platform mounted on the axle between the wheels;
  (d) a handle attached to and extending upwardly from the platform for pivoting the platform about the axle;
  (e) a hydraulic motor mounted to the platform; said motor including:
    (1) a housing secured to the platform; and
    (2) a reciprocating piston rod extending from the housing;
    (3) a hollow cylindrical valve spool slidably mounted on the piston rod for reciprocating movement between a first position and a second position;
    (4) a piston affixed to one end of the piston rod for engaging and moving the valve spool from the first position to the second position; and
    (5) an adjustable stroke collar mounted on the other end of the piston rod for engaging and moving the valve spool from the second position to the first position;
  (f) a tool attachment mounted to the motor housing; said attachment comprising:
    (1) a stationary frame affixed to the motor housing;
    (2) a tool movably mounted to the frame; and
    (3) an interconnecting mechanism between the said tool and the piston rod for transmitting the reciprocating motion to the tool.

References Cited

UNITED STATES PATENTS

| | | | |
|---|---|---|---|
| 2,365,536 | 12/1944 | Fischer et al. | 60—54.5 |
| 2,705,858 | 4/1955 | Marsh | 56—25 |
| 2,774,292 | 12/1956 | Hartmann | 172—40 |
| 3,023,564 | 3/1962 | Tenney et al. | 56—26.5 |
| 1,215,431 | 2/1917 | Tompkins | 91—319 X |
| 1,535,411 | 4/1925 | Hansen | 299—37 X |
| 1,814,649 | 7/1931 | Wade | 172—41 |
| 2,569,507 | 10/1951 | Von Schlegell | 56—26.5 X |
| 2,889,817 | 6/1959 | Hard af Segerstad | 91—319 X |
| 3,376,791 | 4/1968 | Ashfield et al. | 91—290 |
| 3,406,761 | 10/1968 | Ryan | 172—42 |

ROBERT E. PULFREY, Primary Examiner

W. J. CONLON, Assistant Examiner

U.S. Cl. X.R.

56—26.5; 60—52; 91—319; 172—42